Sept. 21, 1937.     C. E. BERGER     2,093,950
HOMOPOLAR GENERATOR
Filed Feb. 18, 1935     6 Sheets-Sheet 2
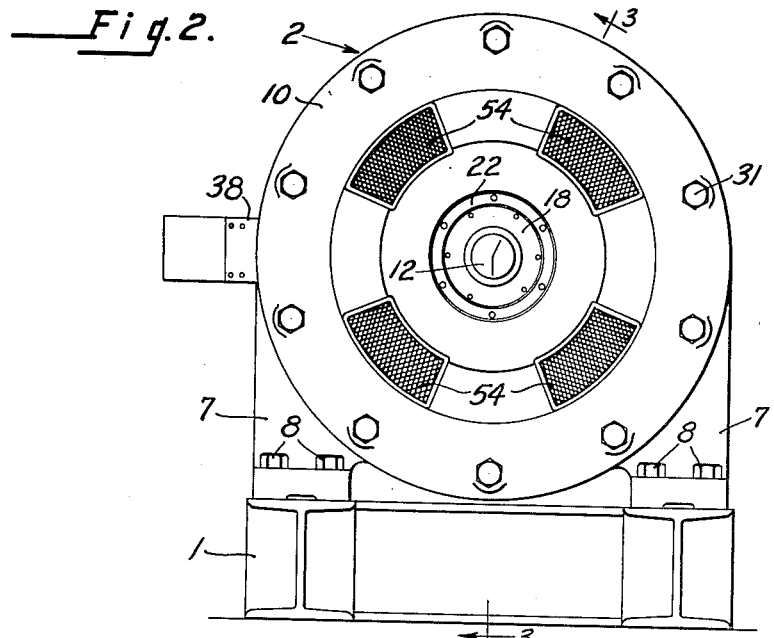
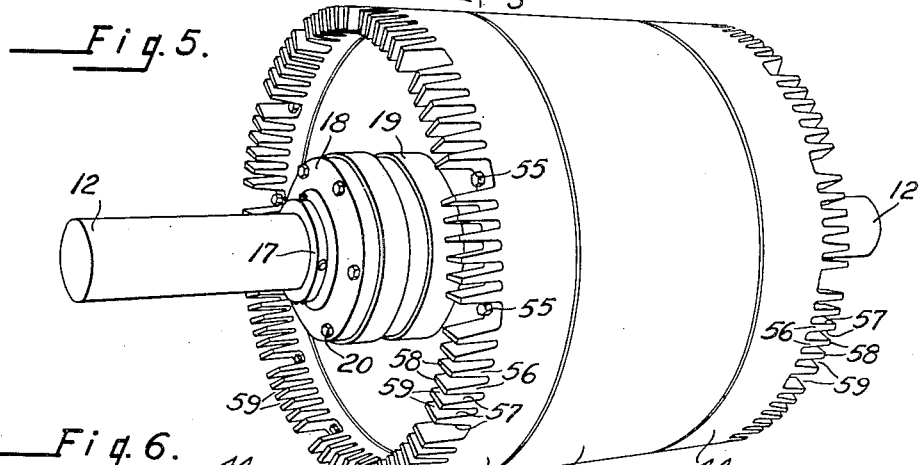
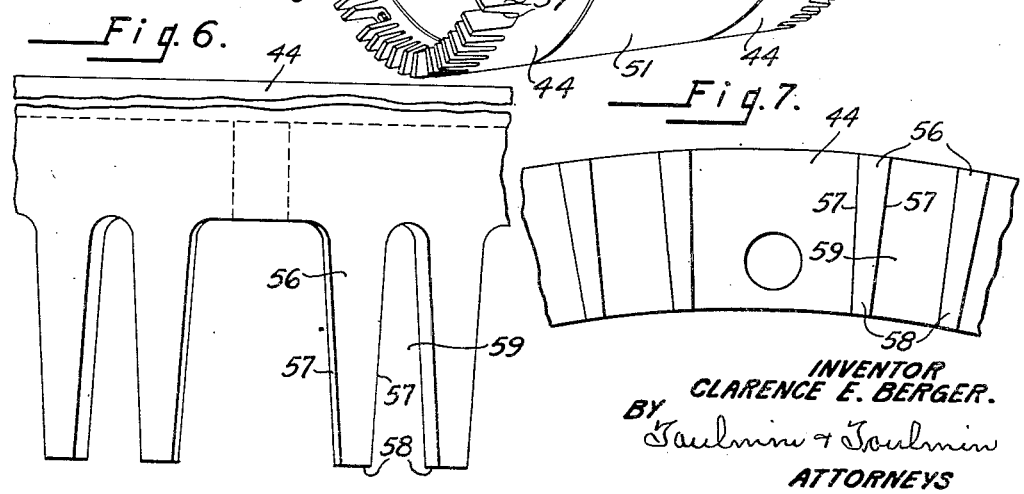
INVENTOR
CLARENCE E. BERGER.
BY Toulmin & Toulmin
ATTORNEYS

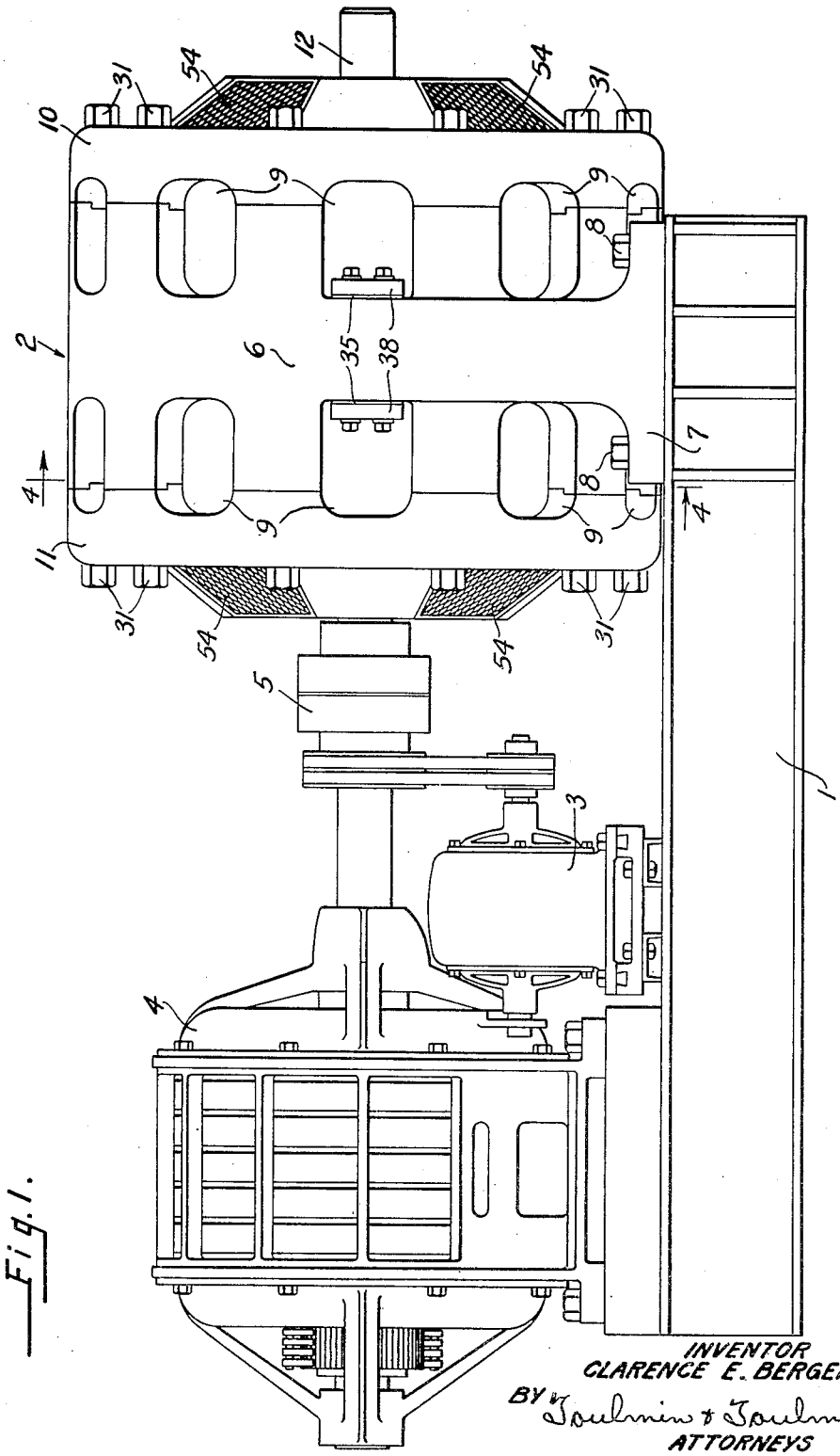

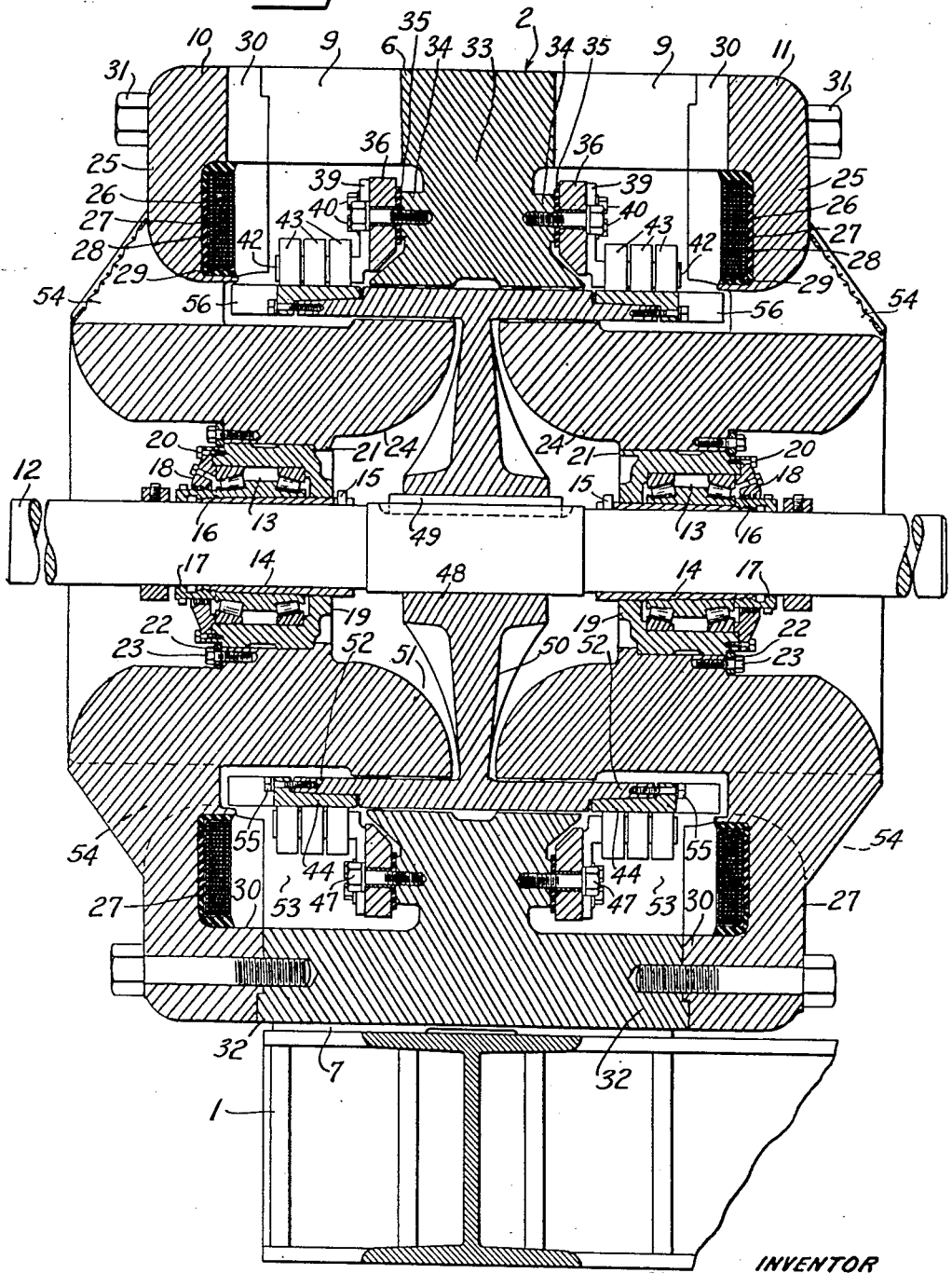

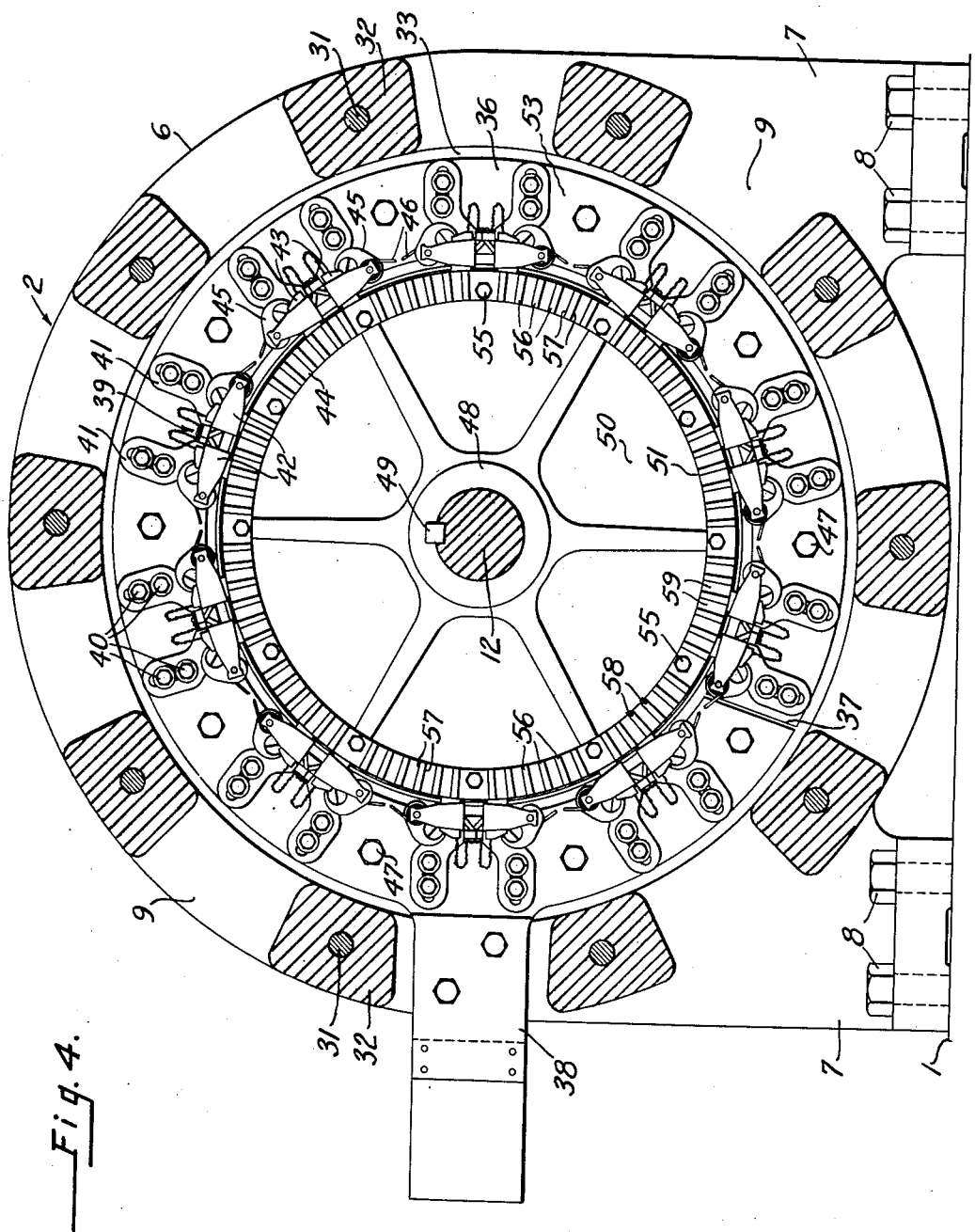

Sept. 21, 1937.   C. E. BERGER   2,093,950
HOMOPOLAR GENERATOR
Filed Feb. 18, 1935   6 Sheets-Sheet 5

INVENTOR
CLARENCE E. BERGER.
BY Toulmin & Toulmin
ATTORNEYS

Sept. 21, 1937. C. E. BERGER 2,093,950
HOMOPOLAR GENERATOR
Filed Feb. 18, 1935 6 Sheets-Sheet 6

INVENTOR
CLARENCE E. BERGER.
BY Toulmin & Toulmin
ATTORNEYS

Patented Sept. 21, 1937

2,093,950

UNITED STATES PATENT OFFICE 2,093,950

HOMOPOLAR GENERATOR

Clarence E. Berger, Shrewsbury, N. J., assignor to Hanson-Van Winkle-Munning Company, Matawan, N. J., a corporation of New Jersey Application February 18, 1935, Serial No. 7,007

11 Claims. (Cl. 171—212)

My invention relates to homopolar generators.

It is the object of my invention to provide a homopolar generator which will be self-cooling.

It is a further object to provide a homopolar generator which will not only move the air through the machine but which will provide means for radiating the heat so that the heat can be transmitted to the air and conveyed away from the machine.

It is an object to provide adequate cooling of the collector rings as one of the important steps in the construction and operation of a successful homopolar generator.

It is also an object to eliminate the losses in a single inductor generator caused by the contact drop and the friction at the surface of the collector rings.

It is an object to provide not only a large area of ring surface in contact with a supply of cooling medium, such as air, but it is also an object to provide a construction of the cooling surfaces so that the heat will be rapidly transmitted from the point at which it is produced to the cooling surfaces, and from the cooling surfaces into the air for rapid transfer out of the machine.

It is an object to provide means for moving the air through the generator and to utilize the same means for transferring the heat rapidly from the point at which it is produced to the cooling surfaces, and thence into the air.

It is a further object to dissipate the heat at the peripheral surface of the slip rings where they make contact with the brushes, as that is the primary point of heat generation.

It is an object to increase the length of the life of the brushes and to prevent the collector rings from becoming over-heated and warping, or causing the brushes to make imperfect contact, which in turn, results in rapid heating of the brushes It is an object to eliminate the drum type of armature and the disc type of armature.

It is an object of this invention to provide a pulley type of armature to eliminate excessive end thrust and so arrange it that it can be ventilated and the bearings can be set close to the center of the machine without danger of magnetic flux through the bearings.

It is an object to provide a plain steel armature rim which offers very little more additional resistance to the flow of current than one having a copper covering, while the copper covering increases the air gap and requires enough additional field excitation to offset any reduction in the armature I R drop.

It is an object to provide a steel armature with non-ferrous collector rings, such as of bronze, brass or copper, or steel slip rings may be employed integral with the balance of the rotor.

I have found that the satisfactory operation of the slip rings in my homopolar generator at high peripheral velocities and high electric loading, can be accomplished by maintaining a low temperature through the means employed in this invention.

It is an object of my invention to provide a pulley type of rotor, the periphery of which is provided with air moving blades that are tapered to form progressive radiating surfaces for the dissipation of heat, thereby forming blades on the end of the collector ring which dissipate the heat from the area of the maximum heat, and at the same time move the air and cause the heat to be dissipated into the air so there is a continued flow of cool air through the machine and a continued transfer of heat from the wedge-shaped tapered blade.

Referring to the drawings:

Figure 1 is a side elevation of the motor, homopolar generator and exciter.

Figure 2 is an end elevation of the homopolar generator.

Figure 3 is a section on the line 3—3 of Figure 2.

Figure 4 is a section on the line 4—4 of Figure 1, which section is at right angles to the section shown in Figure 3.

Figure 5 is a perspective of the rotor of the generator, showing the wedge-shaped fan blades integrally formed with the collector ring constituting heat-radiating fan blades.

Figure 6 is a detail plan view of such fan blade fingers.

Figure 7 is a detail end elevation thereof.

Figure 8:
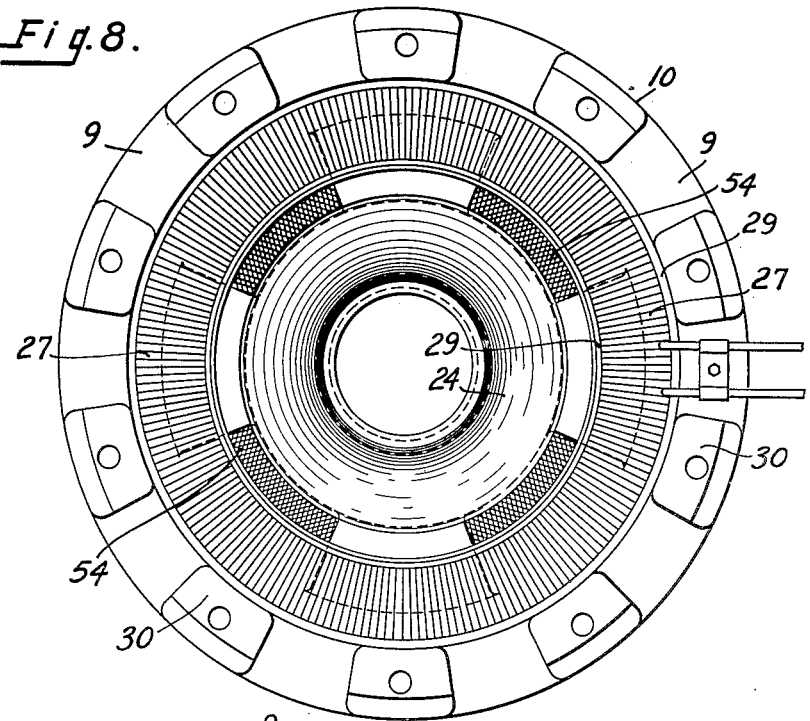
Figure 8 is an elevation of the inside of the stator end ring or the frame end piece.
Figure 9:
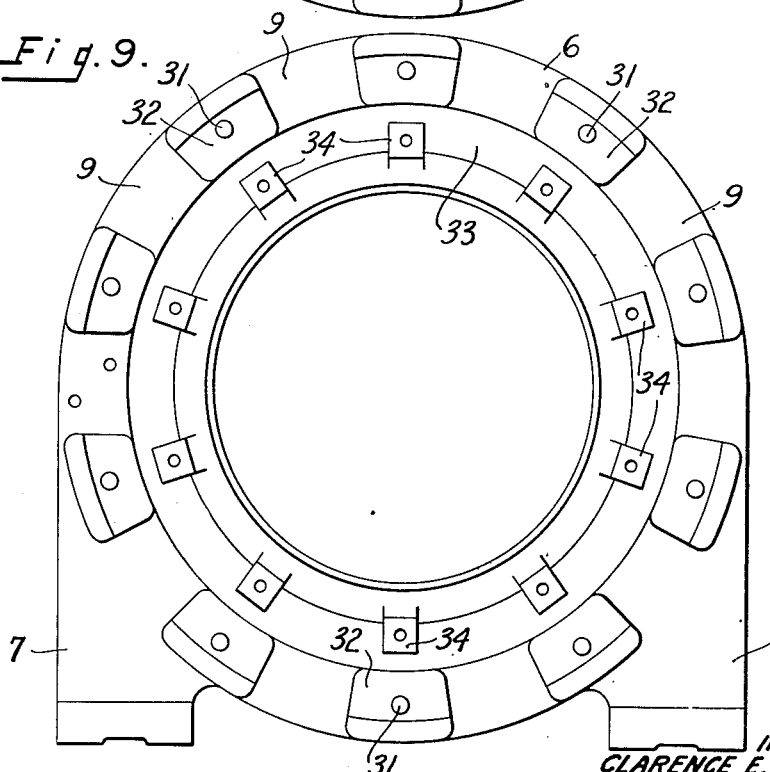
Figure 9 shows in end elevation the center section of the frame.

The homopolar generator of this invention is of the single inductor type.

Referring to the drawings in detail, I designates a base on which is mounted the homopolar generator of this invention, generally designated 2, the exciter 3 and the driving motor 4. The armature shaft of the motor and the rotor shaft of the generator are connected together by the coupling 5.

Turning to the homopolar generator itself, 6 designates the center section of the frame having feet 7 for mounting the generator upon the base 1 by means of bolts 8. This center section is provided with a spaced series of ports 9 at either end of the generator. The sides of these ports are closed by the end frames 10 and 11, making a complete frame for the generator and completing the outline of the ports 9.

The rotor shaft is designated 12 and is carried in the tapered roller bearings 13, mounted in the steel stator end frames 10 and 11. The bearing 13 is mounted upon the tapered sleeve 14, pinned to the shaft by the pin 15. The outer end of the tapered sleeve 14 is threaded at 16, on which is mounted a threaded collar 17, on the surface of which is mounted the grooved collar 18 serving to retain the lubricant in the bearing 13. An intermediate collar 19 is connected with the collar 18 by the bolts 20. This intermediate collar is held between the shoulder 21, on the end frame, and a washer or washer ring 22 held on the end frame by the bolts 23.

The end frame itself is L-shaped in section, as indicated in Figure 3. The horizontal portion, which extends laterally within the ring of the pulley-shaped rotor, is designated 24, and the vertical portion 25 is arranged with a groove 26 in its inner face for receiving the field coils 27, which are mounted upon the insulation 28 and then surrounded with a sealing point 29 on three sides. Above the fields and extending inwardly from them is a series of projections 30, through which pass the bolts 31 that connect the end frame to the center section 6, which is, in its turn, substantially a T-shaped section.

Figure 10:
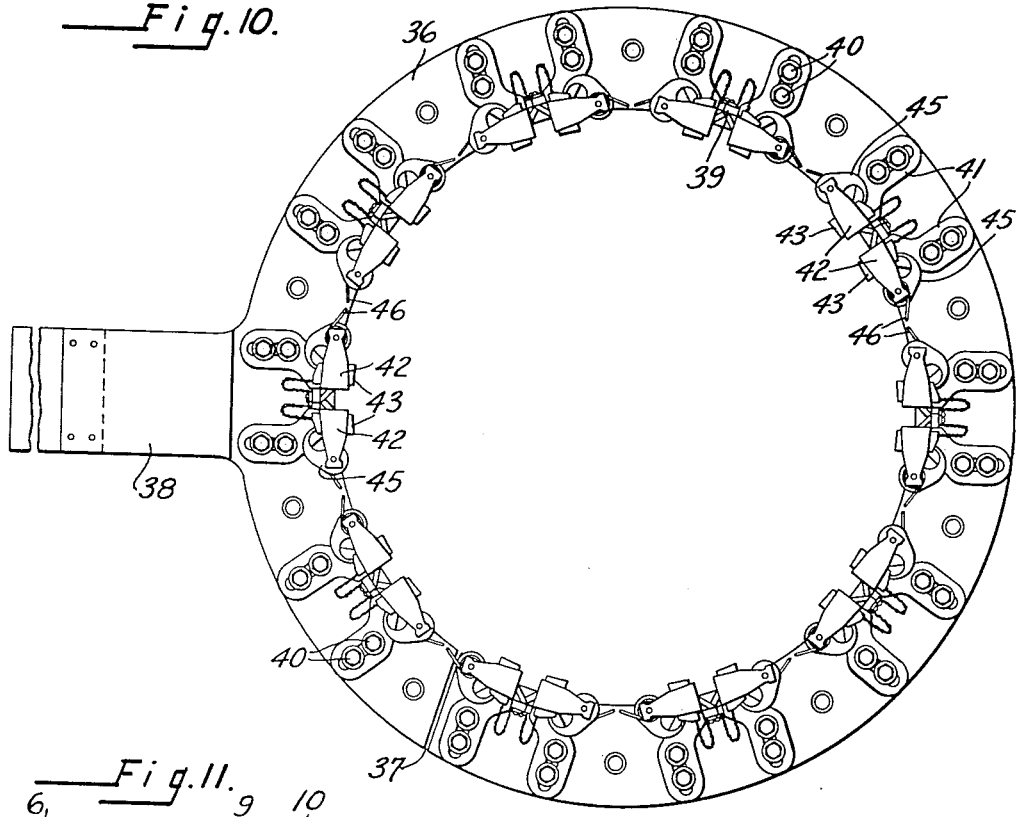
Figure 10 shows in elevation one of the two rings that carry the brush holders.

This center section is provided with horizontal peripheral portions 32 that received the threaded ends of the bolts 31 and the central vertical portion 33. Either side of the central vertical portion 33 is provided with a series of projections 34, on which are mounted insulation blocks 35 that, in turn, carry the brush holder ring of copper, designated 36. This brush holder ring is slotted at 37, as will be seen in Figure 10. It is also provided with a terminal arm 38 that extends through one of the apertures 9.

The brush holders 39 are mounted upon the ring 36 by the bolts 40. The brush holder consists of a radially disposed slotted arm 41 and a laterally extending brush-supporting arm 42 carrying the brushes 43. These brushes are yieldingly pressed into engagement with the collector ring 44 by the fingers 45, which are spring-impelled by the springs 46. The ring 36 is mounted on the central section of the stator 33 through the bolts 47.

The rotor is a pulley-shaped structure having a hub 48 keyed by the key 49 on the shaft 12. This hub is provided with a disc 50 having a pulley-shaped rotor rim 51 that extends between the adjacent surfaces of the stator 24 of the end frame section and the stator portion 33 of the central frame section. The outer end of the rotor rim 51 at 52 is located in a chamber 53. Air is supplied to this chamber through the ports 54 in the end frame. These ports are covered with a wire netting. The air so drawn in, as hereinafter described, is discharged upwardly and out through the ports 9.

In order to bring about the movement of the air as indicated, I provide integrally formed with the collector ring 44, which is mounted on the rotor rim 51 by the bolts 55, a plurality of radiating fins 56. These fins are preferably integral with the collector ring and are spaced apart from one another on radial planes emanating from the axis of the machine. They taper inwardly so their side walls 57 approach one another as they proceed inwardly towards the center of the machine. These fingers also taper towards the outer ends 58 so that as the fin progresses from the collector ring outwardly, its side walls 57 approach one another, thereby leaving wedge-shaped gaps 59 between these radiating fins.

I have found that it is essential for rapid transfer of heat from the collector ring, where the heat is at the maximum, to provide this arrangement for the rapid and progressive radiation of heat from the base of the fins outwardly, and then to use these same fins, that are heat radiating, for the purpose of moving the air through the machine so that the point of maximum movement of the air, which is the fin, is always the point of maximum heat radiation.

Attempts have been made in the past with other types of mechanism to move air through the machine, but they all have been a failure in really practical results because the volume of air moved through the machine can never be great enough to have any appreciable effect upon the heat of the machine unless means is provided for a very rapid transfer of the heat from the machine to the air, and in particular, from the area of maximum heat to the area of maximum air movement. In practice, I have found a very marked difference in the air issuing from the ports 9 in the frame upon the embodiment of these principles of my invention, and the construction carrying them out.

The result has been that I have been able to successfully produce a six-volt, 10,000 ampere homopolar generator with these radiating fins on the slip rings blowing the air through the machine by drawing the air through the inlet orifices 54 at the ends of the generator frame, thence over the collector ring and brushes and associated mechanism, and out at the orifices 9, around the outside of the frame near the ends. I have found it possible to provide sufficiently large orifices in the frame without unduly restricting the path of the magnetic flux if the collector rings are designed to present a large surface to the air and to provide means to transmit heat rapidly from the hot part of the rings to the cooling surfaces.

I have found that the heat is frequently generated at the peripheral surfaces of the slip rings, where they make contact with the brushes, and that the heat generated at other points in the generator is of very little importance. Therefore, in prior art machines which have been generally unsuccessful, the brushes would get too hot so they would break down and wear away rapidly, making it necessary to shut down the generator. If the collector rings become overheated they would warp or become loose, causing the brushes to make an imperfect contact, with consequent rapid heating of the brushes. As the brushes became hotter, the contact drop between the brush and slip ring, in such previous machines, would increase, causing further increase in temperature until the break-down temperature of the brushes was reached.

As the brushes of metal graphite composition are very poor conductors of heat, the mere passing of air over them to cool them is of little use. The heat in the brush faces cannot be transmitted rapidly to the body of the brush, and the brush holders and the brush shunts, and therefore the heat, will not pass rapidly to the air. The heat must be removed from the slip ring, which will take the heat from the brush face, and as the collector rings are made of metal that is commonly of good conductivity, I have found that if I could provide some means of getting the heat out of the collector ring into the air, and the air out of the machine, that the problem would be solved. Merely placing an air-moving fin on the end of the collector ring is insufficient because such fins are too thin to conduct much heat from the body of the ring to the fin surfaces. These fins or blades must be made comparatively thick where they join the body of the ring to provide for the maximum heat flow and heat transfer; and as the fin becomes cooler the thickness is decreased to form a wedge-shaped fin. This resulted in the rapid transfer of heat from the brushes and collector ring progressively through the fins into the air.

It will be further noted that the recess halfway through the bore of the center section of the frame is for the purpose of reducing the flux to the center of the rotor. By doing this and by keeping the inner projections of the frame end pieces some distance from the rotor web, I reduce the end thrust to a negligible factor.

The field coil 27 is wound of No. 30 gauge 1¼" copper strip, with treated paper between the turns. The brush holder ring 36 acts as a series field and is equivalent to a compounding means. In this arrangement I therefore have a ring provided with projections, holes, grooves or fins to increase the area exposed to the air, and to progressively dissipate the heat into the air, while at the same time and in the same vicinity, using such means to move the air and by so doing a heat dissipation rate and quantity are accomplished which cannot be accomplished by blowing a large volume of air into and out of the same area.

Figure 11:
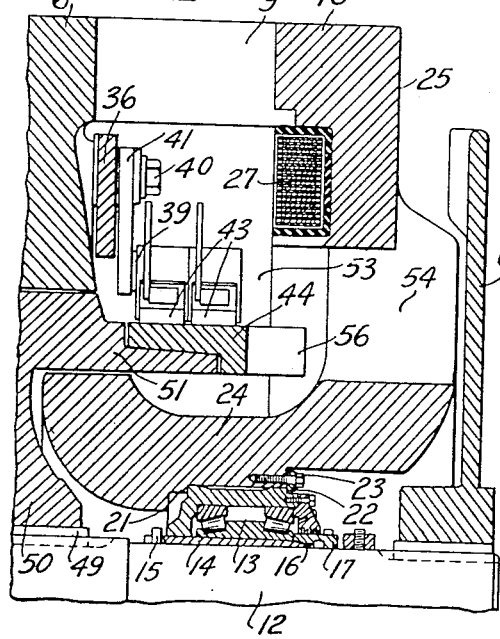
Figure 11 is a section through one-fourth of the generator, showing a modified form in which a supplementary fan member is mounted on the rotor shaft.
Figure 12:
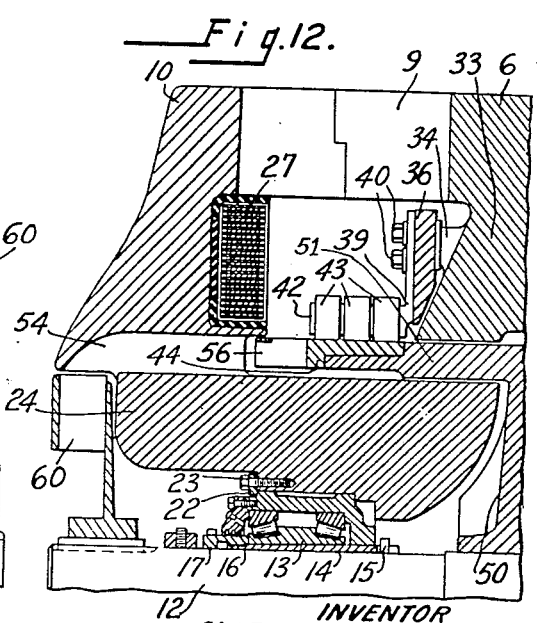
Figure 12 is a quarter section through the stator and rotor showing a modification of the air moving means for causing a forced air circulation through the brush chamber.

Referring to Figures 11 and 12, it is sometimes desirable to add a fan member 60 for increasing the circulation of the air through the machine and adjacent ports thereof. This fan means acts in conjunction with the radiating tapered ribs integrally formed on the collector ring.

I desire to comprehend within my invention such modifications as may be embraced within my claims and the scope of my invention.

Having thus fully described my invention, what I claim as new and desire to secure by Letters Patent, is:

1. In a homopolar generator, a frame comprising a pair of annular end members of L-shaped section and having horizontally disposed ports extending therethrough, an annular center member of T-shaped section secured therebetween and having two series of peripherally spaced radially disposed ports communicating with spaces between the center member and the end members to form a pair of brush chambers, brush means supported in each brush chamber on each side of said center member, a shaft supported in said end members, and a rotor mounted on said shaft and having a rim extending between adjacent portions of the end members and the center member and into the brush chambers, a pair of collector rings on the end portions of the periphery of said rotor in the brush chamber, and wedge-shaped fins on the outer ends of said collector rings arranged to rotate with the rotor in the brush chamber.

2. In a homopolar generator, a frame comprising a pair of annular end members of L-section and having horizontally disposed ports extending therethrough, an annular center member of T-section mounted thereon and interposed therebetween and having two series of peripherally spaced radially disposed ports communicating with a space between the center member and the end members to form a pair of brush chambers, brush means supported in each brush chamber on either side of said center member, a shaft supported in said end members, and a rotor mounted on said shaft and having a rim extending between adjacent portions of the end sections and the center member of the frame and into the brush chambers, a collector ring on one end of the periphery of said rotor in a brush chamber, and wedge-shaped fins on the end of said collector ring arranged to rotate with the rotor in a brush chamber, said fins being located adjacent the end frame apertures.

3. In a homopolar generator, a frame comprising a pair of annular end members of L-section and having horizontally disposed ports extending therethrough, an annular center member of T-section mounted thereon and interposed therebetween and having two series of peripherally spaced radially disposed ports communicating with spaces between the center member and the end members to form a pair of brush chambers, brush means supported in each brush chamber on either side of said center member, a shaft supported in said end members, and a rotor mounted on said shaft, having a rim extending between adjacent portions of the end members and the center member of the frame and into the brush chamber, a collector ring on the periphery of said rotor in each brush chamber, wedge-shaped fins on the end of each collector ring adapted to rotate with the rotor in the brush chamber, and field windings mounted in said end frame members adjacent each brush chamber.

4. In a homopolar generator, a frame comprising a pair of annular end members of L-shaped section having horizontally disposed ports extending therethrough, an annular center member of T-shaped section mounted therebetween and having two series of peripherally spaced radially disposed ports communicating with spaces between the center member and the end members to form a pair of brush chambers, brush means supported in each brush chamber, a shaft supported in said end members, and a rotor mounted on said shaft and having a rim extending between adjacent portions of the end members and the center member of the frame and into the brush chambers, a collector ring on the periphery of said rotor disposed in each brush chamber, wedge-shaped fins formed in the outer edges of said collector rings adapted to rotate with the rotor in the brush chamber, and field windings mounted in said end members adjacent said brush chambers, the means for supporting said brushes comprising brush rings mounted on the center member of the frame.

5. In a homopolar generator, a pair of annular end frames of L-shaped section having end ports in the vertical portion thereof, an annular intermediate frame member of T-shaped section having radially disposed ports in the horizontal portion thereof, an annular rotor of T-shaped section having the horizontal portion thereof extending between the horizontal portions of the end frames and the bottom of the vertical portion of the intermediate frame member, a shaft for said rotor mounted in the end frames, brushes mounted to engage said rotor between said apertures, and wedge-shaped air moving fins mounted on said rotor adjacent said brushes for collecting, dissipating and radiating heat and for moving the air through the machine for carrying away heat.

6. In a homopolar generator, a pair of annular end frames of L-shaped section having end ports in the vertical portion thereof, an annular intermediate frame member of T-shaped section having a radially disposed portion in the horizontal portion thereof, a rotor of T-shaped annular section having the horizontal portion thereof extending between the horizontal portion of the end frames and the bottom of the vertical portion of the intermediate frame member, a shaft for said rotor mounted in the end frames, brushes mounted to engage said rotor between said apertures, and wedge-shaped air moving fins mounted on said rotor adjacent said brushes for collecting, dissipating and radiating heat and for moving the air through the machine for carrying away the heat progressively, laterally and radially.

7. In combination in a homopolar generator, a shaft, a pulley-shaped rotor and a collector ring having its collecting surface flush with the peripheral surface of said rotor and mounted on each of the peripheral margins thereof, said rings having axially extending wedge-shaped fins formed in the outer edges thereof and closely spaced radially thereon, ported end frames and a ported center frame forming cooling air paths each comprising an axial inlet portion and a radial outlet portion connected by a single bend, a brush supporting ring and brush holders mounted theron and carrying brushes engaging said collector ring, and field windings carried on said end frames, said wedge-shaped fins being so arranged as to convey heat from the brushes and the collector ring and progressively radiate said heat toward the axially outwardly directed tips of the fins and simultaneously move air inwardly through the ports in the end frame through the axial inlet portion of said path, through said bend, and into and through said radial outlet portion of said path for carrying away the heat.

8. In combination in a homopolar generator, of a rotor shaft, axially and radially ported steel frames having chambers in either end thereof connecting the axial and radial ports to form coiling air paths each comprising an axial inlet portion and a radial outlet portion connected by a single bend, a pulley-shaped steel rotor extending through a slot in the frame into each of said chambers, a non-ferrous brush supporting means and brushes carried thereby mounted in said chamber on said frame and insulated therefrom, an insulated field winding at either end of said frame, a non-ferrous cylindrical collector ring mounted on the periphery of said rotor having the collecting surface flush with the periphery of said rotor and having a plurality of longitudinally disposed radially arranged wedge-shaped fins integrally formed on the outer edge thereof, whereby the maximum heat which occurs in the collector ring is dissipated into the moving air by the heat radiating fins which simultaneously move the air into the chambers through the axial ports in the frame and through said chamber and out through the radial ports.

9. In a homopolar generator, a shaft, a frame having axially disposed end ports and radially disposed peripheral ports communicating with a chamber in the frame to form a cooling air path comprising an axial inlet portion and a radial outlet portion connected by a single bend, brushes mounted in said chamber, a rotor mounted on the shaft having a rim extending into said chamber, a collector means comprising a band rigidly secured on the peripheral edges of said rotor rim engaging with the brushes and having a plurality of longitudinally disposed wedge-shaped air moving and heat dissipating fins formed integrally therewith and adapted to move air axially inwardly and radially outwardly through said path while conveying heat from said collector means thereto; and a supplementary fan means mounted on said shaft adjacent some of the ports in said frame.

10. In combination in a homopolar generator of a stator having a brush chamber and an axial inlet port joined by a straight axial passage to said brush chamber and a radial outlet port joined to said brush chamber by a radial passage, means for permitting air to circulate therethrough, a rotor extending into said brush chamber having a plurality of axially disposed outwardly directed tapered air-moving heat-radiating fins mounted on the peripheral edges thereof adjacent the inlet opening adapted to move air axially into the chamber and radially therefrom, and means exterior of the inlet opening in the stator for forcing air therethrough over said fins and thence out of the stator.

11. In a homopolar generator, a frame having therein a cooling air path comprising an axially disposed inlet portion and a radially disposed outlet portion connected thereto by a single bend, a rotor mounted for rotation in said frame and having a collector ring disposed adjacent the bend in said cooling air path, said rotor having thereon means adapted progressively to convey heat from said collector ring to said cooling air path while moving air axially inwardly and radially outwardly through said path.

CLARENCE E. BERGER.